United States Patent Office.

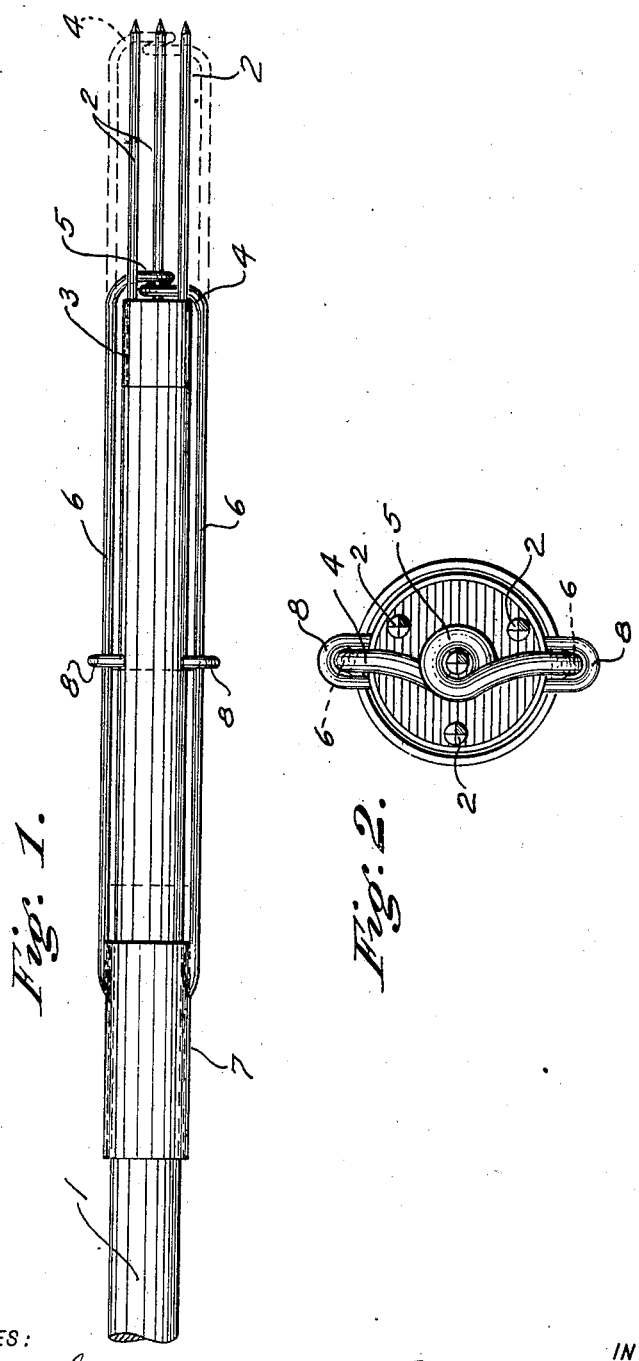

ANDREW JOHNSON, OF CHICAGO, ILLINOIS.

WEEDER.

SPECIFICATION forming part of Letters Patent No. 693,717, dated February 18, 1902.

Application filed August 12, 1901. Serial No. 71,766. (No model.)

*To all whom it may concern:*

Be it known that I, ANDREW JOHNSON, a citizen of the United States of America, and a resident of Chicago, in the county of Cook and State of Illinois, have invented certain new and useful Improvements in Weeders, of which the following is a specification.

The main object of my invention is to provide an improved form of weeder of inexpensive and durable structure and suitable for readily pulling weeds without cutting their roots. I accomplish this object by the device shown in the accompanying drawings, in which—

Figure 1 is a plan of a weeder constructed according to my invention, showing the handle partly broken away. Fig. 2 is an end view of same.

In the form shown the handle 1 has a cluster of prongs 2 seated in one end and projecting therefrom. The handle is reinforced by the ferrule 3 at the end to which the prongs are secured. The member 4 is designed for detaching the weeds from the prongs 2 and consists of the part 5, looped around the middle prong 2, and the shanks 6, which are secured to the sleeve 7. The sleeve 7 is longitudinally slidable on the handle 1 and serves to move the member 4 to the position indicated by the dotted lines in Fig. 1. The staples 8 are driven into the handle 1 and serve as guides for the shanks 6. The member 4 is preferably made of wire.

The operation of my device is as follows: The operator holds the device preferably with one hand on the sleeve 7. To extract a weed, he will first force the prongs 2 into the ground at the base of the weed, while the member 4 is in the position indicated by the full lines in Fig. 1. He will then slightly twist or turn the handle, so as to cause the prongs 2 to bind against the stem or base of the weed. He will then tilt the device so as to raise its prong end, and thereby pull the weed transversely of the direction of the prongs. The operator will now push the sleeve 7 toward the prong end, and thus detach the weed from the prongs by bringing the member 4 into the position indicated by the dotted lines in Fig. 1.

It will be seen that the device entangles the weed and is thus adapted for pulling same without cutting the roots.

It will be understood that some of the details of construction of the device shown may be altered without departing from the spirit of my invention. I therefore do not confine myself to such details except as hereinafter limited in the claims.

What I claim as my invention, and desire to secure by Letters Patent, is—

1. A weeder comprising a handle having a cluster of prongs projecting from one end, and a member for detaching the weeds from the prongs, movable longitudinally thereof and having an extension provided with a sleeve longitudinally slidable on the handle for operating said member.

2. A weeder comprising a handle having a cluster of prongs projecting from one end, a sleeve longitudinally slidable on said handle a considerable distance from said prongs, and an extension secured to said sleeve and acting between said prongs longitudinally thereof for detaching the weeds from the prongs.

Signed at Chicago this 6th day of August, 1901.

ANDREW JOHNSON.

Witnesses:
EUGENE A. RUMMLER,
WM. R. RUMMLER.